United States Patent [19]

Nagasawa et al.

[11] Patent Number: 4,965,674
[45] Date of Patent: Oct. 23, 1990

[54] RECORDING AND REPRODUCING SYSTEM WITH SELECTIVE MATRIX CONVERSION

[75] Inventors: Kenichi Nagasawa; Taizou Hori, both of Kanagawa, Japan

[73] Assignee: Canon Kabushiki Kaisha, Tokyo, Japan

[21] Appl. No.: 265,753

[22] Filed: Nov. 1, 1988

[30] Foreign Application Priority Data

Nov. 10, 1987 [JP]  Japan ................................. 62-284566
Dec. 7, 1987 [JP]  Japan ................................. 62-310010

[51] Int. Cl.⁵ ............................................. H04N 5/76
[52] U.S. Cl. ................................... 358/341; 360/19.1; 381/26; 369/86
[58] Field of Search ................... 360/19.1; 369/86, 89, 369/90; 358/343, 341; 381/26

[56] References Cited

U.S. PATENT DOCUMENTS

| Re. 29,360 | 8/1977 | Takahashi | 369/90 |
| 4,466,117 | 8/1984 | Görike | 381/26 |
| 4,523,236 | 6/1985 | Hayashi et al. | 348/341 |
| 4,630,134 | 12/1986 | Kanamaru | 360/19.1 |
| 4,823,197 | 4/1989 | Sakata et al. | 358/343 |

Primary Examiner—Robert L. Richardson
Attorney, Agent, or Firm—Robin, Blecker, Daley & Driscoll

[57] ABSTRACT

An audio signal recording system comprising a first apparatus for generating a sum signal of left and right signals of a stereophonic audio signal and a difference signal of the left and right signals, and a second apparatus for recording on a recording medium the sum signal and the difference signal which have been generated by the first apparatus, without converting the sum signal and difference signal into the left and right signals.

18 Claims, 6 Drawing Sheets

RECORDING AND REPRODUCING SYSTEM WITH SELECTIVE MATRIX CONVERSION

BACKGROUND OF THE INVENTION

1. Field of the Invention

The present invention relates to an audio signal recording system and, more particularly, to a system of this kind that records on a recording medium a stereophonic audio signal as a sum signal and a difference signal of left and right signals thereof.

2. Description of the Related Art

A system which records a stereophonic audio signal as a signal expressing the sum (L+R) of a left (L) signal and a right (R) signal and a signal expressing the difference (L−R) therebetween is suitable for use in a system in which one of two recording channels is mainly used and the other is used supplementarily.

This is because a monophonic audio signal can be reproduced even when no signal has been recorded in the supplementarily used recording channel.

FIG. 1 shows an example of the arrangement of such a recording apparatus. The recording apparatus has terminals 20 and 21 to which signals L and R are respectively input, a matrix circuit 22 for forming signals (L+R) and (L−R) from the signals L and R, modulators 23 and 24 for modulating the signals (L+R) and (L−R), respectively, and a recording and reproducing section 25 capable of simultaneously recording or reproducing signals for two channels which have been output by the modulators 23 and 24.

Signals for two channels which have been reproduced by the recording and reproducing section 25 are supplied to demodulators 26 and 27 wherein signals (L+R) and (L−R) for the basebands are obtained respectively. These signals output from the demodulators 26 and 27 are supplied to a matrix circuit 28 whereby signals L and R are extracted. The signals are then output from terminals 29 and 30.

One example of a system in which a stereophonic audio signal is transmitted as a sum (L+R) signal and a difference (L−R) signal of left and right signals L and R thereof is the so-called television sound multiplex broadcast system.

FIGS. 2(A) and 2(B) show the spectral distributions of signals transmitted by a television sound multiplex broadcast system. FIG. 2(A) shows the spectral distribution of a television audio multiplex signal in one channel, in which the symbol Y represents the spectral distribution of a luminance signal, C represents that of a carrier chrominance signal, and A represents that of an audio multiplex signal. Further, the symbol VC represents a carrier of the video signal, AC represents an FM carrier of the audio signal, and CSC represents a color subcarrier.

FIG. 2(B) shows the spectral distributions of signals transmitted by the FM carrier AC of the audio signal, in which the symbols A1 and A2 represent bands occupied by a main audio signal and a sub-audio signal, respectively, ASC represents an FM subcarrier of the sub-audio signal, and X represents a control signal for discrimination. The control signal X for discrimination does not exist when the main audio signal and the sub-audio signal are signals (L+R) and (L−R), whereas, it does exist when the main audio signal and the sub-audio signal are first and second audio signals, respectively; the first audio signal is a main audio signal, and the second audio signal is an audio signal different from the first audio signal, for instance, a foreign language signal in bilingual broadcasting.

FIG. 3 shows a typical arrangement of a known apparatus for receiving a television audio multiplex signal such as that shown in FIGS. 2(A) and 2(B). Reference numeral 1 denotes a tuner unit which outputs a television audio multiplex signal, such as that shown in FIG. 2(A), being transmitted over one channel.

The apparatus also has a video detecting circuit 2 which performs the AM detection of a carrier VC (in FIG. 2(A)) of a video signal and generates a video signal which is then output through a video signal output terminal 3.

Reference numeral 4 denotes an audio FM detecting circuit which performs the FM detection of an FM carrier AC (in FIG. 2(A)) of an audio signal and generates an audio multiplex signal such as that shown in FIG. 2(B). A low-pass filter (LPF) 5 is provided for the purpose of extracting a main audio signal from the audio multiplex signal, and a band-pass filter (BPF) 6 is provided for the purpose of extracting a frequency-modulated sub-audio signal from the audio multiplex signal. An FM detecting circuit 7 performs the FM detection of the frequency-modulated sub-audio signal which has thus been extracted by the BPF 6, and then the circuit 7 outputs a detected sub-audio signal.

Another BPF 8 separates a discrimination control signal X from the audio multiplex signal, and the thus separated discrimination control signal X is supplied to an AM detecting circuit 9. The output of the circuit 9 is at a high level when the discrimination control signal X exists, whereas, it is at a low level when the signal X does not exist. Switches 10 and 11 are changeover switches each of which is connected to a side B when the output from the AM detecting circuit 9 is high and is connected to a side A when that output is low. Reference numeral 12 denotes a matrix circuit which comprises an adder and a subtracter and which outputs signals L and R. Accordingly, when the discrimination control signal X does not exist, audio output terminals 13 and 14 output the signals L and R, whereas, when the control signal X exists, they output first and second audio signals.

The so-called M-S microphones are known as microphones employed mainly in commercial use. An M-S microphone comprises a first unidirectional microphone unit directed to the front, and a second bidirectional microphone unit directed to the sides, which units are accommodated in a single housing. A signal M output from the first microphone unit and a signal S output from the second microphone unit are synthesized by a summation-difference matrix circuit (not shown), thereby obtaining signals L and R.

FIG. 4(A) shows the directivities (m) and (s) of the first and second microphone units of a typical M-S microphone. FIG. 4(B) shows an example of the directivities (l) and (r) of signals L and R which have been obtained by synthesizing the signals S and M in the summation-difference matrix circuit.

With an M-S microphone such as that illustrated, if the magnitude of the output from the second microphone unit is varied, the angle 8 at which the stereophonic sound spreads can be changed. The M-S microphone is advantageous in that it enables the spreading angle $\theta$ to be electrically adjusted by remote control.

When an audio signal is output to a sound outputting device such as speakers, the audio signal must be in the form of L and R signals. However, in the case where the output of the receiving apparatus such as that shown in FIG. 3 or the output of the M-S microphone such as that described above is to be recorded by the recording apparatus such as that shown in FIG. 1, audio signals (L+R) and (L−R) for two channels are first converted into signals L and R by being passed through a matrix circuit provided for the microphone or the receiving apparatus, and are then passed through another matrix circuit 22 before they are recorded. If the signals are passed through matrix circuits twice in this way, there is a risk of the left-and-right separation characteristic of a stereophonic audio signal being deteriorated. Further, noise components may tend to become mixed. In such cases, therefore, it is impossible to perform good recording of the stereophonic audio signal.

SUMMARY OF THE INVENTION

A primary object of the present invention is to eliminate the above-stated problems.

Another object of the invention is to provide an audio signal recording system which is capable of very good recording of an stereophonic audio signal output from a apparatus for receiving a television audio multiplex signal or from an M-S microphone.

To this end, according to one aspect of the present invention, there is provided an audio signal recording system comprising: a generating apparatus for generating a sum signal of left and right signals of a stereophonic audio signal and a difference signal of the left and right signals; and a recording apparatus for recording on a recording medium the sum signal and the difference signal which have been generated by the generating apparatus, without converting the sum signal and the difference signal into the left and right signals.

A further object of the present invention is to provide an audio signal recording and reproducing system which is capable of good recording and reproducing of a stereophonic sum signal and a stereophonic difference signal with a simplified circuit arrangement.

To this end, according to another aspect of the present invention, there is provided an audio signal recording and reproducing system comprising: generating means for generating a sum signal of left and right signals of a stereophonic audio signal and a difference signal of the left and right signals; recording means for recording on a recording medium the sum signal and the difference signal which have been generated by the generating means; reproducing means for reproducing the sum signal and the difference signal recorded on the recording medium; selection means for outputting either the sum signal and the difference signal which have been generated by the generating means or the sum signal and the difference signal which have been reproduced by the reproducing means; and matrix circuit for converting the sum signal and the difference signal which have been output by the selection means into the left and right signals, and for outputting the left and right signals.

The above and other objects and features of the present invention will become more apparent from the following detailed description of embodiments thereof when considered with reference to the drawings.

DETAILED DESCRIPTION OF THE PREFERRED EMBODIMENTS

Figure 1:
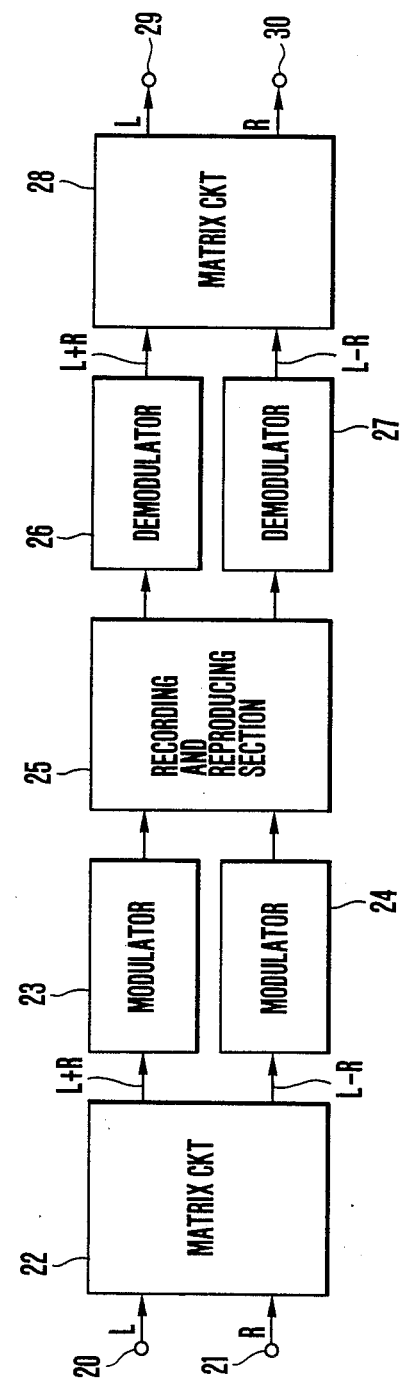
FIG. 1 is a view showing an example of the arrangement of the known stereophonic audio signal recording apparatus.
Figure 2B:
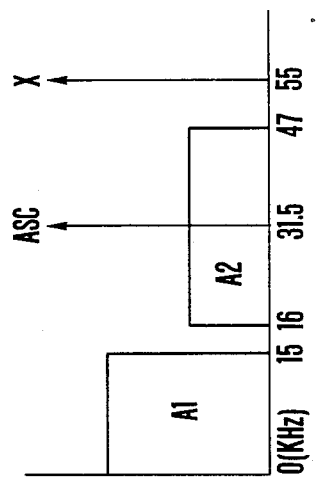
FIG. 2(A) and 2(B) are views showing the spectral distributions of signals transmitted by a television sound multiplex broadcast system.
Figure 2A:
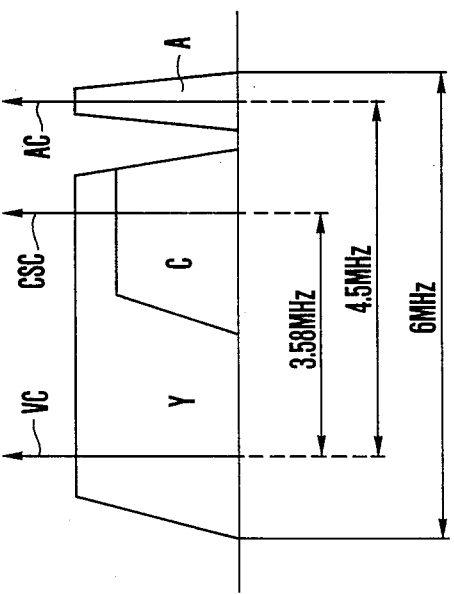
Figure 3:
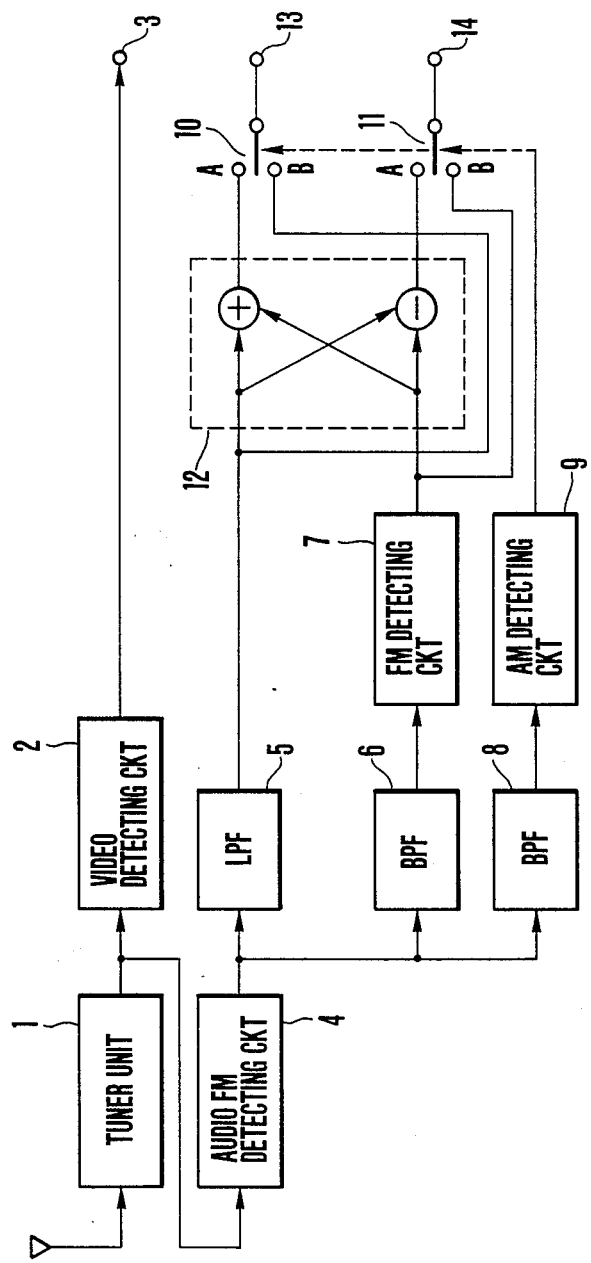
FIG. 3 is a view showing a typical arrangement of a known apparatus for receiving a television audio multiplex signal.
Figure 5:
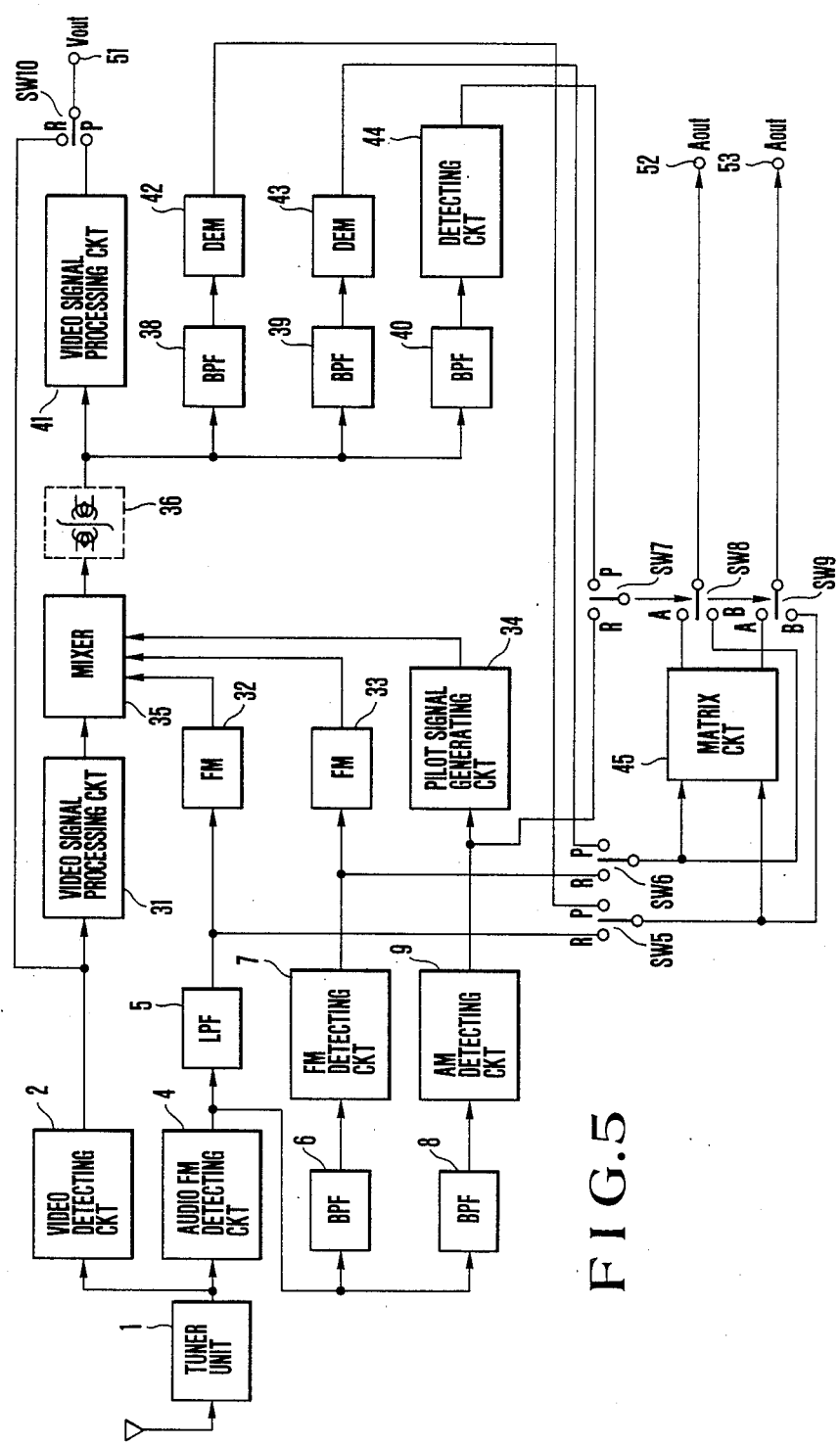
FIG. 5 is a view schematically showing the arrangement of a system in accordance with one embodiment of the present invention.

FIG. 5 is a view showing the arrangement of a video recorder incorporating a tuner unit, in accordance with one embodiment of the present invention. In the drawing, components which correspond to those shown in FIG. 3 are denoted by the same reference numerals, and description of those components will be omitted.

The system has a video signal processing circuit 31 for providing a video signal output from a video detecting circuit 2 with a signal from suitable for magnetic recording. Specifically, the luminance signal is subjected to frequency modulation in such a manner as to be provided with a center frequency of about 7 MHz, and the carrier chrominance signal is subjected to frequency conversion in such a manner as to be provided with a center frequency of about 0.7 MHz.

The system also has a frequency modulator 32 for frequency modulating the main audio signal in such a manner as to provide it with a center frequency of 1.5 MHz, another frequency modulator 33 for frequency modulating the sub-audio signal in such a manner as to provide it with a center frequency of 1.7 MHz, and a pilot signal generating circuit 34 which generates a pilot signal having a frequency of 1.6 MHz, when an AM detecting circuit 9 determines that a pilot signal P exists in the output of a tuner unit 1. i.e., when the AM detecting circuit 9 produces a high-level output.

Figures 6, 7:
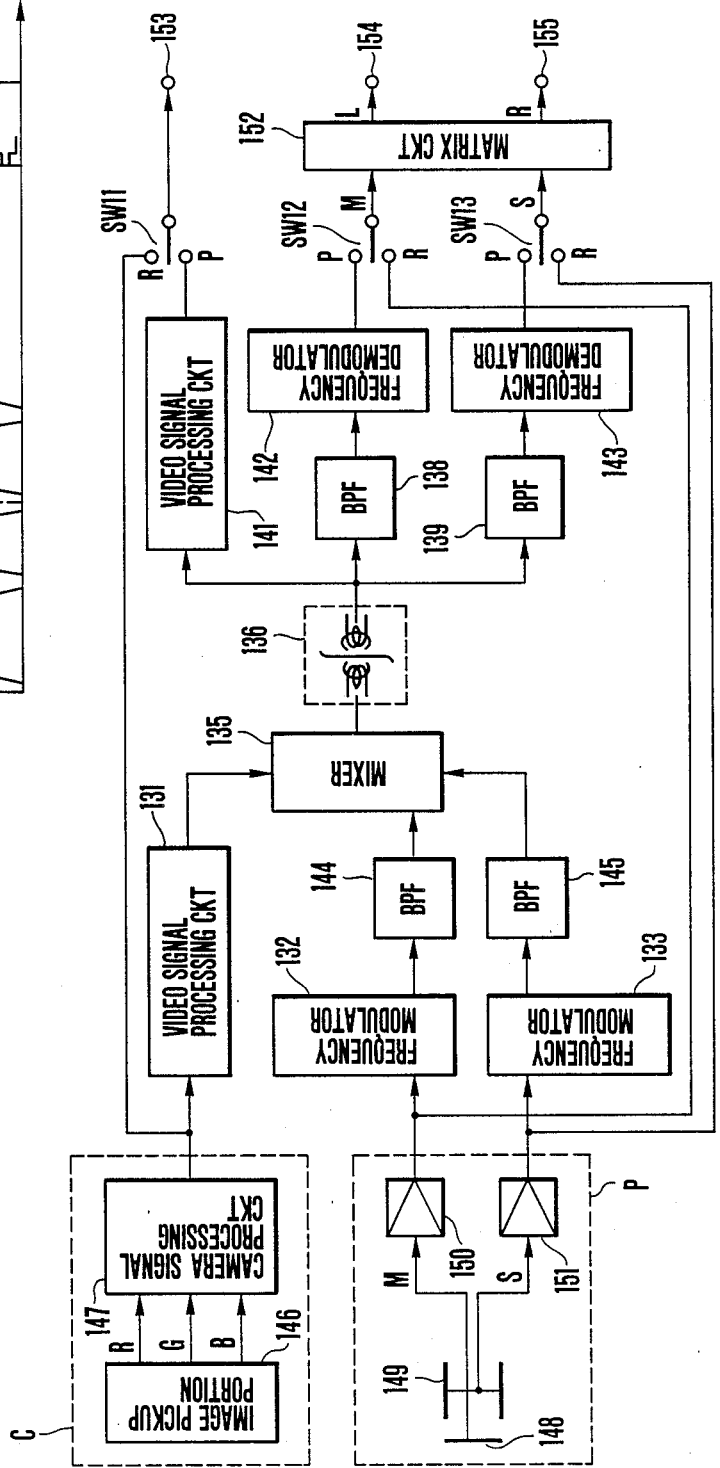
FIG. 6 is a view showing the frequency allocation in a signal recorded by the system shown in FIG. 5.
FIG. 7 is a view showing the arrangement of a VTR incorporating a camera, in accordance with another embodiment of the present invention.

Reference numeral 35 denotes a mixer for mixing together the video signal output by the video signal processing circuit 31, the frequency-modulated main audio signal, the frequency-modulated sub-audio signal, and the pilot signal. An output of the mixer 35 is supplied, as a recording signal, to a recording and reproducing section (electromagnetic conversion section) 36, and is then recorded on a magnetic medium. FIG. 6 shows the frequency allocation in the recording signal. In the drawing, the symbol C represents the frequency-converted carrier chrominance signal, A1 represents the FM main audio signal, A2 represents the FM sub-audio signal, and Y represents the FM luminance signal. Further, the symbol P represents the pilot signal.

Referring again to FIG. 5, reference numerals 38 and 39 denote BPFs for separating the FM main audio signal and the FM sub-audio signal, respectively, from a reproduced signal. Outputs of the BPFs 38 and 39 are respectively supplied to frequency demodulators 42 and 43 whereby they are frequency-demodulated. Another video signal processing circuit 41 operates to recover the original band of the low-band-converted carrier chrominance signal, to frequency demodulate the FM luminance signal, then to mix these signals and output them. Another BPF 40 extracts solely the pilot signal components at 1.6 MHz from the reproduced signal. A pilot signal detecting circuit 44 determines whether or not any pilot signal exists in the reproduced signal. When the pilot signal does exist therein, the output of the circuit 44 goes high, whereas, when the pilot signal does not exist therein, that output goes low.

Switches SW5, SW6, SW7 and SW10 are provided, which are each connected to a side R during recording and to a side P during reproduction, by the action of a system controller (not shown). Therefore, during recording, the switch SW5 outputs the main audio signal in the audio signal received, whereas, during reproduction, it outputs the main audio signal in the signal reproduced. Similarly, during recording, the switch SW6 outputs the sub-audio signal in the audio signal received, whereas, during reproduction, it outputs the sub-audio signal in the signal reproduced. Further, the switch SW7 outputs a binary signal which, during recording, indicates whether or not the pilot signal exists in the signal received, and, during reproduction, indicates whether or not the pilot signal exists in the signal reproduced.

The switch SW10 supplies, during recording, the video signal received and, during reproduction, the video signal reproduced to a video output terminal (Vout) 51, as a video signal to be output.

Signals output from the switches SW5 and SW6 are supplied to a matrix circuit 45. When these signals are a sum (L+R) signal and a difference (L−R) signal of left and right signals of the stereophonic audio signal being processed, a left signal and a right signal are obtained from the matrix circuit 45. The output from the switch SW7 indicates whether those signals being output from the switches SW5 and SW6 are signals (L+R) and (L−R) or a first audio signal and a second audio signal. On the basis of the output of the switch SW7, switches SW8 and SW9 operate to output either the left and right signals which have been output by the matrix circuit 45 or the first and second audio signals which have been output by the switches SW5 and SW6. Reference numerals 52 and 53 denote audio output terminals for two channels.

According to the above-described embodiment, signals (L+R) and (L−R) can be recorded without any intervention of a matrix circuit, thereby making the audio signal to be recorded substantially free from being deteriorated. In addition, since the number of the matrix circuits required can be reduced, the circuit arrangement can be simplified. Further, when consideration is given solely to the recording apparatus, since the two-channel audio signals to be recorded are either first and second audio signals or signals (L+R) and (L−R), when these two-channel audio signals have been received, they can be recorded directly, irrespective of whether the signal received by the receiving apparatus comprises first and second audio signals or a stereophonic audio signal. By virtue of this arrangement, the passage through which signals are transmitted between receiving and recording can be devoid of any switching circuits, thereby enabling recording of signals in good condition.

FIG. 7 shows the arrangement of a video recorder incorporating a camera, in accordance with another embodiment of the present invention.

The system has an image pickup portion 146 which operates to convert an image of an object into electric signals representing three primary colors R, G and B, and to output these signals. The primary-color signals obtained by the image pickup portion 146 are input to a camera signal processing circuit 147, thereby obtaining a signal known as a composite video signal in which a luminance signal and a carrier chrominance signal are multiplexed. In FIG. 7, a broken-line C designates a video camera section.

Figure 4B:
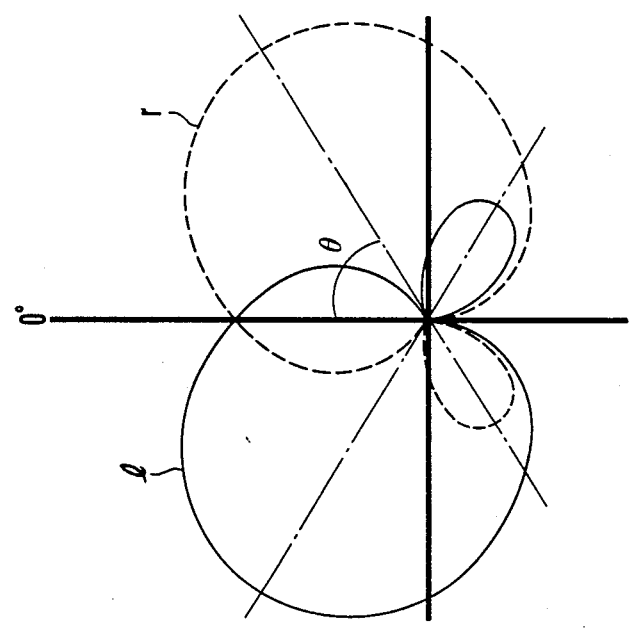
FIG. 4(A) and 4(B) are views used to explain the directivities of an M-S microphone.
Figure 4A:
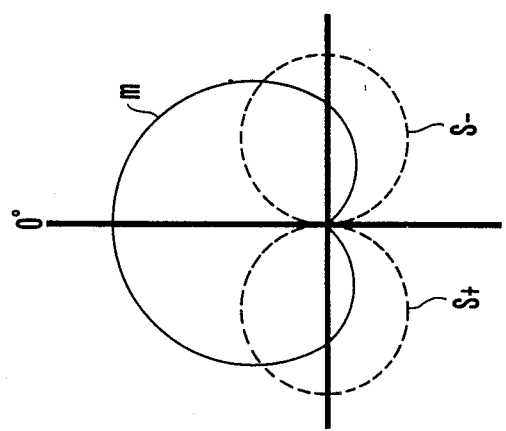

The system also has a unidirectional microphone unit 148 directed to the front, and a bidirectional microphone unit 149 directed to the sides, which generate signals M and S, respectively, having directivities (m) and (s) such as those shown in FIG. 4(A). Amplifiers 150 and 151 are provided for amplifying the signals M and S, and they constitute a microphone section P together with the microphone units 148 and 149.

A video signal processing circuit 131 operates to provide the composite video signal which has been obtained by the camera signal processing circuit 147 with a signal form suitable for magnetic recording. Specifically, the luminance signal is subjected to frequency modulation in such a manner as to be provided with a center frequency of about 7 MHz, and the carrier chrominance signal is subjected to frequency conversion in such a manner as to be provided with a center frequency of about 0.7 MHz.

The system further has a frequency modulator 132 for frequency modulating the signal M serving as a first or main audio signal, in such a manner as to provide it with a center frequency of 1.5 MHz, and another frequency modulator 133 for frequency modulating the signal S serving as a second audio signal or sub-audio signal, in such a manner as to provide it with a center frequency of 1.7 MHz.

Reference numeral 135 denotes a mixer for mixing together the video signal output by the video signal processing circuit 131, the frequency-modulated main audio signal, and the frequency-modulated sub-audio signal. An output of the mixer 135 is supplied, as a recording signal, to a recording and reproducing section (electromagnetic conversion section) 136, and is then recorded on a magnetic recording medium. The frequency allocations of the frequency-converted carrier chrominance signal C, the FM first audio signal A1, the FM second audio signal A2, and the FM luminance signal Y in the recording signal are the same as those shown in FIG. 6.

Reference numerals 138 and 139 denote BPFs for separating the FM main audio signal and the FM sub-audio signal, respectively, from a reproduced signal. Outputs of the BPFs 138 and 139 are respectively supplied to frequency demodulators 142 and 143 whereby they are frequency-demodulated. A video signal processing circuit 141 operates to recover the original band of the low-band-converted carrier chrominance signal, to frequency demodulate the FM luminance signal, then to mix these signals and output a composite video signal.

Switches SW11, SW12 and SW13 are provided, which are each connected to a side R during recording and to a side P during reproduction. When the switch SW11 is connected to the side R, the composite video signal which has been obtained by the camera signal processing circuit 147 is output from an output terminal 153 so that the signal can be used in monitoring. If an electronic view-finder is employed, an output of the terminal 153 is input to the electronic view-finder. When the switches SW12 and SW13 are each connected to the side R, a matrix circuit 152 is supplied with the signals M (L+R) and S (L−R) which have been obtained by the microphone section P, and the circuit 152 calculates the sum (M+S) of the signals M and S and the difference (M−S) therebetween, whereby signals L and R having directivities (l) and (r), such as those shown in FIG. 4(B), are output through terminals 154 and 155.

During reproduction, the switch SW11 is connected to the side P, whereby a composite video signal, which has been obtained by the video signal processing circuit 141 on the basis of a signal reproduced by the recording and reproducing section 136, is output through the output terminal 153. When the switches SW12 and SW13 are each connected to the side P, the matrix circuit 152 is supplied with the signals M and S which have been obtained by the frequency demodulators 142 and 143 on the basis of a signal reproduced by the recording and reproducing section 136, and the circuit 152 outputs signals L and R which are then output through the terminals 154 and 155.

With the above described VTR incorporating a camera, signals M (L+R) and S (L−R) can be recorded without any intervention of a matrix circuit, thereby enabling sounds which have been collected by the microphone section P to be recorded while they are substantially prevented from becoming deteriorated. In addition, since the number of the matrix circuits required can be reduced, the circuit arrangement can be simplified. In particular, since the microphone and the video camera are incorporated in the same housing as the recording and reproducing apparatus, the L and R signals can be recovered from either the signals M and S indicative of sounds collected by the microphone section P or the reproduced signals M and S by a single matrix circuit.

Although, in the above-described embodiment, the present invention is applied to a VTR incorporating a camera, the present invention may be applied to, for instance, a system in which signals (L+R) and (L−R) are recorded by an audio-specialized equipment.

What is claimed is:

1. An audio signal recording system comprising:
   (a) receiving means for receiving a transmission signal including a modulated signal for a sum signal of left and right signals of a stereophonic audio signal and a modulated signal for a difference signal of said left and right signals;
   (b) demodulating means for demodulating said modulated signal for said sum signal and said modulated signal for said difference signal which are included in said transmission signal that has been received by said receiving means; and
   (c) recording means for recording on a recording medium said sum signal and said difference signal which have been demodulated by said demodulating means without converting said sum signal and said difference signal into said left and right signals.

2. A system according to claim 1, wherein said receiving means, said demodulating means, and said recording means are accommodated in a common housing.

3. A system according to claim 1, wherein said recording means includes a first frequency modulating circuit for frequency-modulating said sum signal, a second frequency modulating circuit for frequency-modulating said difference signal, and a multiplexing circuit for frequency-multiplexing signals output by said first and second frequency modulating circuits.

4. A system according to claim 1, wherein said receiving means includes a television tuner which generates a multiplexing signal including said modulated signal for said sum signal, said modulated signal for said difference signal and a modulated signal for a video signal, and said demodulating means is arranged to further demodulate said modulated signal for said video signal.

5. A system according to claim 4, wherein said recording means is arranged to frequency-multiplex said sum signal, said difference signal and said video signal which have been demodulated by said demodulating means and to record resultant signals on said recording medium.

6. A system according to claim 1, further comprising reproducing means for reproducing said sum signal and said difference signal recorded on said recording medium; selecting means arranged to have as input signals thereto said sum signal and said difference signal demodulated by said demodulating means and said sum signal and said difference signal reproduced by said reproducing means, and to selectively output said sum signal and said difference signal demodulated by said demodulating means or said sum signal and said difference signal reproduced by said reproducing means; and matrix means for converting said sum signal and said difference signal output by said selecting means into said left and right signals to be output.

7. An audio signal recording system comprising:
   (a) a stereophonic microphone having a first unidirectional microphone unit directed frontally for outputting a sum signal of right and left signals of a stereophonic audio signal and a second bidirectional microphone unit sidewardly directed for outputting a difference signal of said right and left signals; and
   (b) recording means for recording on a recording medium said sum signal and said difference signal which have been output by said first and second microphone units, without converting said sum signal and said difference signal into said left and right signals.

8. A system according to claim 7, wherein said recording means includes a first frequency modulating circuit for frequency-modulating said sum signal, a second frequency modulating circuit for frequency-modulating said difference signal, and a multiplexing circuit for frequency-multiplexing signals output by said first and second frequency-modulating circuits.

9. A system according to claim 8, further comprising a video camera for outputting a video signal.

10. A system according to claim 9, wherein said recording means is arranged to frequency-multiplex said sum signal and said difference signal which have been obtained from said first and second microphone units and said video signal which has been obtained from said video camera, and to record resultant signals.

11. A system according to claim 7, further comprising reproducing means for reproducing said sum signal and said difference signal recorded on said recording medium; selecting means arranged to have as inputs thereto said sum signal and said difference signal output by said first and second microphone units and said sum signal and said difference signal reproduced by said reproducing means, and to selectively output said sum signal and said difference signal output by said first and second microphone units or said sum signal and said difference signal reproduced by said reproducing means; and matrix means for converting said sum signal and said difference output by said selecting means into said left and right signals to be output.

12. An audio signal recording and reproducing apparatus comprising:
   (a) receiving means for receiving a transmission signal including a modulated signal for a sum signal of left and right signals of a stereophonic audio signal and a modulated signal for a difference signal of said left and right signals;
   (b) demodulating means for demodulating said modulated signal for said sum signal and said modulated signal for said sum signal and said modulated signal for said difference signal which are included in said transmission signal that has been received by said receiving means;
   (c) recording means for recording on a recording medium said sum signal and said difference signal which have been demodulated by said demodulating means;
   (d) reproducing means for reproducing said sum signal and said difference signal recorded on said recording medium;
   (e) selection means arranged to have as inputs thereto said sum signal and said difference signal reproduced by said reproducing means and said sum signal and said difference signal demodulated by said demodulating means for outputting either said sum signal and said difference signal demodulated by said demodulating means or said sum signal and said difference signal reproduced by said reproducing means; and
   (f) a matrix circuit for converting said sum signal and said difference signal which have been output by said selection means into said left and right signals, and for outputting said left and right signals.

13. An apparatus according to claim 12, wherein said receiving means includes a television tuner which generates a multiplexing signal including said modulated signal for said sum signal, said modulated signal for said difference signal and a modulated signal for a video signal, and said demodulating means is arranged to further demodulate said modulated signal for said video signal.

14. An apparatus according to claim 13, wherein said recording means is arranged to frequency-multiplex said sum signal, said difference signal and said video signal which have been demodulated by said demodulating means, and to record resultant signals on said recording medium.

15. An apparatus, according to claim 12, wherein said receiving means, said demodulating means, said recording means, said reproducing means, said selection means, and said matrix circuit are all accommodated in a common housing.

16. An audio signal recording and reproducing apparatus comprising:
   (a) a stereophonic microphone having a first unidirectional microphone unit frontally directed for outputting a sum signal of right and left signals of a stereophonic audio signal and a second bidirectional microphone unit sidewardly directed for outputting a difference signal of said right and left signals;
   (b) recording means for recording on a recording medium said signal and said difference signal which have been output by said first and second microphone units.
   (c) reproducing means for reproducing said sum signal and said difference signal recorded on said recording medium;
   (d) selection means arranged to have as inputs thereto said sum signal and said difference signal reproduced by said reproducing means and said sum signal and said difference signal output by said first and second microphone units for outputting either said sum signal and said difference signal output by said first and second microphone units or said sum signal and said difference signal reproduced by said reproducing means; and
   (e) a matrix circuit for converting said sum signal and said difference signal which have been output by said selection means into said left and right signals, and for outputting said left and right signals.

17. An apparatus according to claim 16, further comprising a video camera for outputting a video signal.

18. An apparatus according to claim 17, wherein said recording means is arranged to frequency-multiplex said sum signal and said difference signal which have been obtained from said video camera, and to record the resultant signals.

* * * * *